United States Patent [19]

Coffre

[11] Patent Number: 5,365,752

[45] Date of Patent: Nov. 22, 1994

[54] FREEZING APPARATUS

[75] Inventor: Paul A. Coffre, Chatswood, Australia

[73] Assignee: The Commonwealth Industrial Gases Limited, North Sydney, Australia

[21] Appl. No.: 90,728

[22] Filed: Jul. 13, 1993

[30] Foreign Application Priority Data

Jul. 13, 1992 [AU] Australia .................. PL3508

[51] Int. Cl.⁵ ........................................ F25D 17/02
[52] U.S. Cl. ............................... 62/374; 62/63; 62/266; 62/380
[58] Field of Search ................. 62/63, 380, 266, 374

[56] References Cited

U.S. PATENT DOCUMENTS

| | | |
|---|---|---|
| 2,679,115 | 5/1954 | Bogaty et al. . |
| 3,170,309 | 2/1965 | Federighi et al. . |
| 3,393,532 | 7/1968 | Khoylian . |
| 3,813,895 | 6/1974 | Klee et al. ............... 62/266 |
| 3,841,109 | 10/1974 | Cann .......................... 62/380 |
| 3,938,350 | 2/1976 | Martin et al. ............. 62/380 |
| 4,056,950 | 11/1977 | Kaufman, Jr. ............ 62/266 |
| 4,077,226 | 3/1978 | Strong . |
| 4,078,398 | 3/1978 | Cloudy ...................... 62/380 |
| 4,750,276 | 6/1988 | Smith et al. . |
| 4,757,691 | 7/1988 | Compagnon . |
| 4,803,851 | 2/1989 | Stokes ....................... 62/380 |
| 4,852,358 | 8/1989 | Acharya et al. .......... 62/380 |
| 4,949,555 | 8/1990 | Chao . |
| 5,148,687 | 9/1992 | Tamei et al. .............. 62/266 |

Primary Examiner—Ronald C. Capossela
Attorney, Agent, or Firm—David A. Draegert; Larry R. Cassett

[57] ABSTRACT

A freezing tunnel includes a longitudinally extending housing defining a cooling cavity containing a cooling atmosphere which progresses from one end of the tunnel to the other end. An endless mesh belt extends through the housing for carrying articles to be frozen. A shroud is located within the housing and extends transversely across the belt and terminating in edges which define an opening. The shroud defines an inner region and an outer region between the inner region and the housing and includes first and second longitudinally spaced shroud portions, each having respective apertures for allowing fluid communication between the inner and outer regions. Electrically driven fans direct the cooling atmosphere through the respective apertures and the opening and past the articles to be frozen.

17 Claims, 7 Drawing Sheets

FREEZING APPARATUS

TECHNICAL FIELD

The present invention relates to a freezing apparatus having a tunnel containing a shroud defining an inner region and outer region wherein the cooling atmosphere is circulated past the food on a conveyor in a more cost effective manner.

BACKGROUND OF THE PRIOR ART

Commercial freezing systems have included a housing defining a tunnel through which runs an endless conveyor which is constructed from mesh or the like. The food preparations to be frozen are placed on the conveyor and transported through the tunnel. A number of fans are disposed along the length of the tunnel in order to circulate a cooling atmosphere.

The cooling atmosphere is desirably circulated past the food and through the conveyor and back around to the fans in order to achieve an efficient freezing operation. However, a large quantity of the cooling atmosphere is circulated above the conveyor and therefore not used effectively to freeze the food moving through the tunnel.

In order to overcome this problem it has been proposed to establish a secondary flow of cooling atmosphere below and parallel to the length of the conveyor, thereby creating a venturi effect and causing the cooling atmosphere to move past the food and through the conveyor. This secondary flow of the cooling atmosphere requires the use of additional internal motors to produce the necessary circulation of the atmosphere. However, the heat generated by these additional motors reduces the overall efficiency of the freezing operation within the tunnel.

As the number of the motors is increased and the power of each motor is raised to maximize the venturi effect, there is a corresponding increase in the amount of heat generated which reduces cooling efficiency. Such tunnels are also disadvantageous because they do not effectively prevent the escape of the cooling atmosphere from the tunnel exit.

The spraying zone of conventional freezing systems also inadequately preserve the cooling atmosphere. It is desirable that the atmosphere in the spraying zone, which is the coldest in the tunnel, be evenly distributed across the width of the conveyor to insure uniform cooling of the product. The use of curtains at either end of the spraying zone has been contemplated, however, these fail to provide sufficient isolation from the circulating atmosphere in adjacent zones.

It would, therefore, be desirable to provide a freezing system which efficiently circulates the cooling atmosphere past the food and through the conveyor without the use of expensive secondary cooling devices.

SUMMARY OF THE INVENTION

According to a first aspect of the present invention there is provided a freezing apparatus comprising a longitudinally extending tunnel housing for containing a cooling atmosphere which progresses from one end of the housing to the other, conveyor means extending through the housing and being substantially pervious to said atmosphere for carrying articles to be frozen, and a shroud located within the housing and terminating in an opening disposed adjacent the conveyor means for defining an inner region within the shroud and an outer region between the inner region and the housing, said shroud including first and second longitudinally spaced shroud portions each having both an aperture for allowing fluid communication between said regions and airflow means for directing said cooling atmosphere through the apertures and said opening and past said articles, wherein substantially all of the longitudinal progression of the cooling atmosphere between said first and second portions occurs in said outer region. Preferably, the shroud includes a gas curtain disposed in said inner region between said first and second shroud portions for substantially preventing the passage of said atmosphere within said inner region between said portions.

According to a second aspect of the invention there is provided a freezing apparatus comprising a longitudinally extending tunnel housing for containing a cooling atmosphere which progresses from one end of the housing to the other, conveyor means extending through the housing and being substantially pervious to said atmosphere for carrying articles to be frozen, and a shroud located within the housing and terminating in an opening disposed adjacent said conveyor means for defining an inner region within said shroud and an outer region between the inner region and said housing, said shroud including first and second longitudinally spaced shroud portions each having both an aperture for allowing fluid communication between said regions and airflow means for directing said cooling atmosphere through the aperture and said opening and past said articles, wherein substantially all of the longitudinal progression of the cooling atmosphere between said first and second portions occurs in said inner region.

Preferably, the shroud includes a wall extending outwardly from the junction of the first and second portions to said housing for substantially preventing, in said outer region, any longitudinal progression of said cooling atmosphere between said first and second portions. It is also preferred that the tunnel includes at least two shroud portions sequentially longitudinally arranged within said housing to ensure that the progression of said cooling atmosphere between adjacent shroud portions occurs alternately in said inner and outer regions. In addition, the adjacent shroud portions may be separated in said inner region by intermediate gas curtains.

According to a third aspect of the invention there is provided a freezing apparatus comprising a tunnel housing for containing a cooling atmosphere which progresses from a first to a second end of the housing, conveyor means extending through the housing and being substantially pervious to said atmosphere for carrying articles to be frozen and a shroud disposed within the housing and terminating in an opening adjacent the conveyor means for defining an inner region within said shroud and an outer region between the inner region and the housing, said shroud including a first zone where the cooling atmosphere is introduced into said inner region and an adjacent second zone disposed between said first zone and said first end and having at least one aperture, and airflow means for directing said cooling atmosphere through said aperture from said inner to said outer region, wherein the cooling atmosphere is thereafter directed through said outer region past said first zone and toward said second end. In this embodiment of the invention, the first and second zones are preferably separated in said inner region by a gas curtain.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
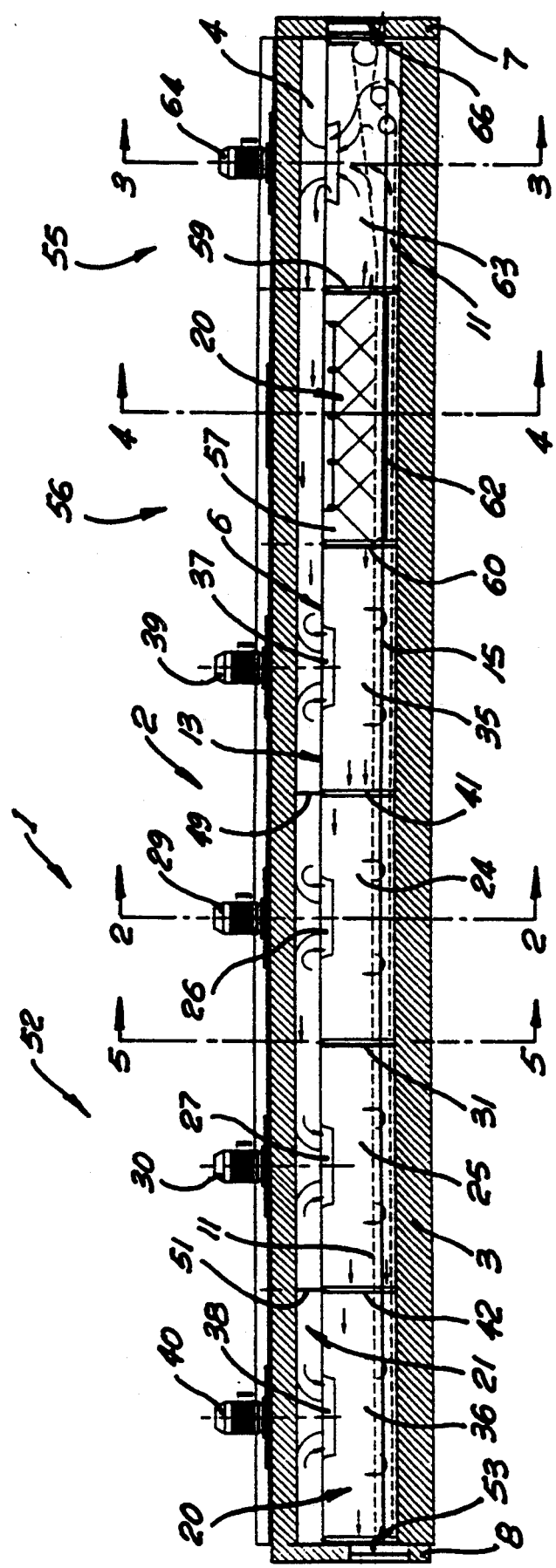
FIG. 1 is a cross-sectional view of a freezing tunnel according to the invention.
Figure 2:
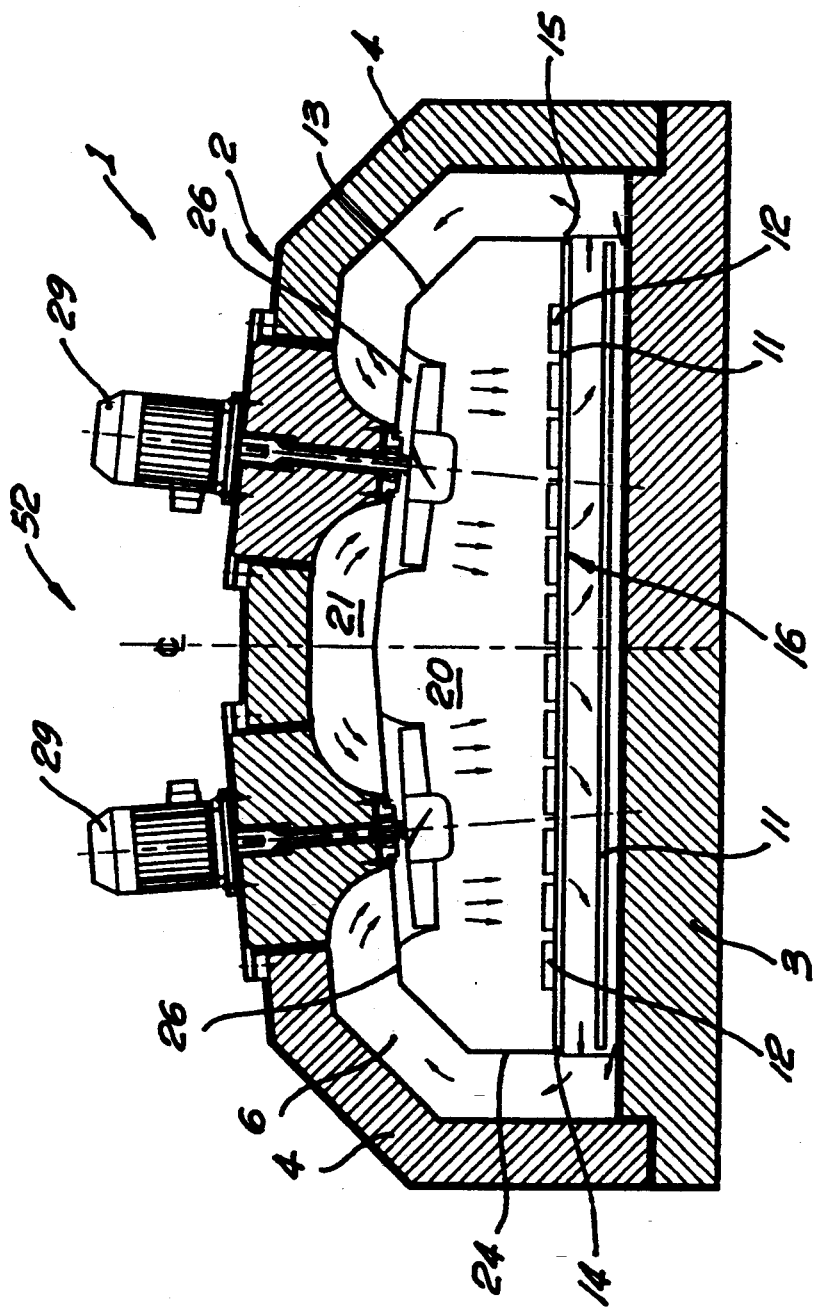
FIG. 2 is a sectional view taken through line 2—2 of FIG. 1.

Referring to the drawings, and particularly to FIGS. 1 and 2, a freezing apparatus 1 in accordance with the present invention includes a longitudinally extending tunnel housing 2 having a base 3 and arched wall 4 for defining a cooling cavity 6. Cavity 6 contains a cooling atmosphere which progresses from a first end 7 to a second end 8 of housing 2. Conveyor means in the form of an endless mesh belt 11 extends through the housing for carrying articles 12 to be frozen. A shroud 13 located within the tunnel housing 2 extends transversely across the belt 11 and terminates in edges 14 and 15 which define an opening 16. Shroud 13 defines an inner region 20 within the shroud and an outer region 21 between the region 20 and the housing 2. Shroud 13 includes first and second longitudinally spaced shroud portions 24 and 25, respectively, each having two respective apertures 26 and 27 for allowing fluid communication between regions 20 and 21. Air flow means in the form of electrically driven fans 29 and 30 direct the cooling atmosphere through the respective apertures 26 and 27 and opening 16 and past the articles 12. Substantially all the longitudinal progression of the cooling atmosphere between portions 24 and 25 occurs in the outer region 21.

Figure 5:
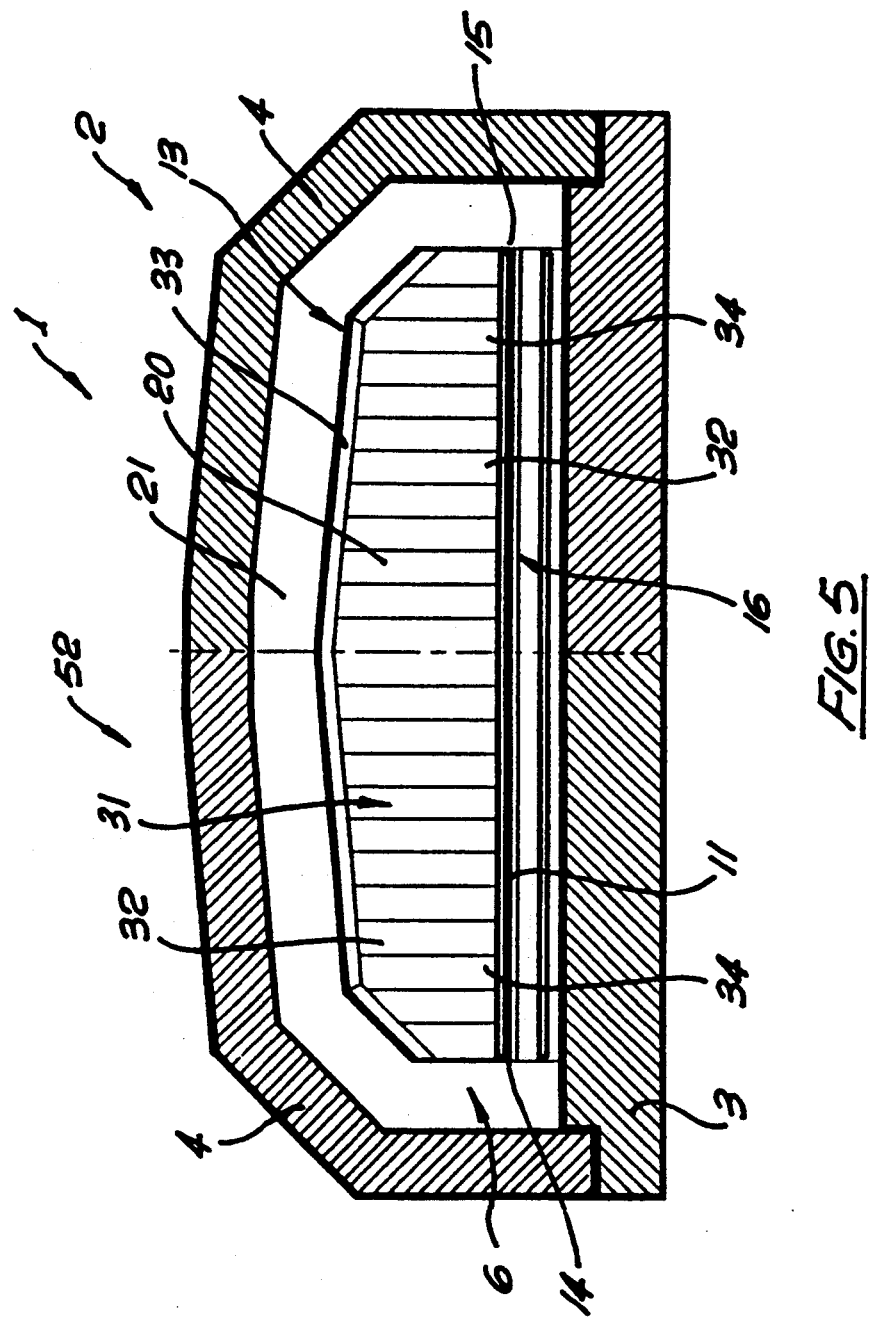
FIG. 5 is a sectional view taken along line 5—5 of FIG. 1.

Disposed within the region 20 between adjacent portions 24 and 25 is a gas curtain 31 which impedes the longitudinal progression of the cooling atmosphere. Curtain 31 is illustrated in FIG. 5 and is comprised of a plurality of parallel flexible strips 32 which depend downwardly from a rack 33 and terminate in lower ends 34 adjacent belt 11. Such curtains are well known in the art.

Shroud 13 also includes shroud portions 35 and 36 disposed adjacent shroud portions 24 and 25 respectively. Shroud portions 35 and 36 each include two apertures 37 and 38 and associated fans 39 and 40 along with gas curtains 41 and 42 for impeding longitudinal movement of the cooling atmosphere between adjacent shroud portions within inner region 20.

Adjacent shroud portions 24 and 35, and 25 and 36 are separated in the outer region 21 by respective walls 49 and 50. These walls extend outwardly from the junction between the respective shroud portions and terminate against the tunnel housing 2 for substantially preventing any longitudinal progression, within outer region 21, of the cooling atmosphere between those shroud portions thus separated.

Consequently, the cooling atmosphere which is progressed into the outer region 21 about shroud portion 35 is circulated by fans 39 between the inner and outer regions 20, 21 and past the articles being conveyed on belt 11. Any further longitudinal progression along outer region 21 is prevented due to the wall 49. As a result the cooling atmosphere will slowly be progressed through the gas curtain 41 and into the inner region 20 of shroud portion 24. Thereafter, due to the action of fans 29, the atmosphere will be circulated between the inner and outer regions 20, 21 of the shroud portion 24 and past the articles on the belt 11. However, the gas curtain 31 provides in the inner region 20, a far greater relative impedance to longitudinal progression of the cooling atmosphere to shroud portion 35 than exists in outer region 21. Accordingly, substantially all the atmosphere will progress to shroud portion 25 via the outer region 21.

It will be appreciated that adjacent shroud portions 25 and 36 are configured to provide a similar serpentine path for the cooling atmosphere as that provided by shroud portions 35 and 24. Consequently, the movement of the cooling atmosphere through these portions is substantially identical as that described above.

Shroud portions 24, 25, 36 and 37 collectively define an entrance zone 52 of the tunnel 1. That is, the articles to be frozen enter tunnel 1 through an opening 53 in the end 8 and are sequentially longitudinally progressed through the housing 2 in a direction opposite to the longitudinal movement of the cooling atmosphere. In this way the articles are progressively exposed to a lower temperature cooling atmosphere.

Figure 4:
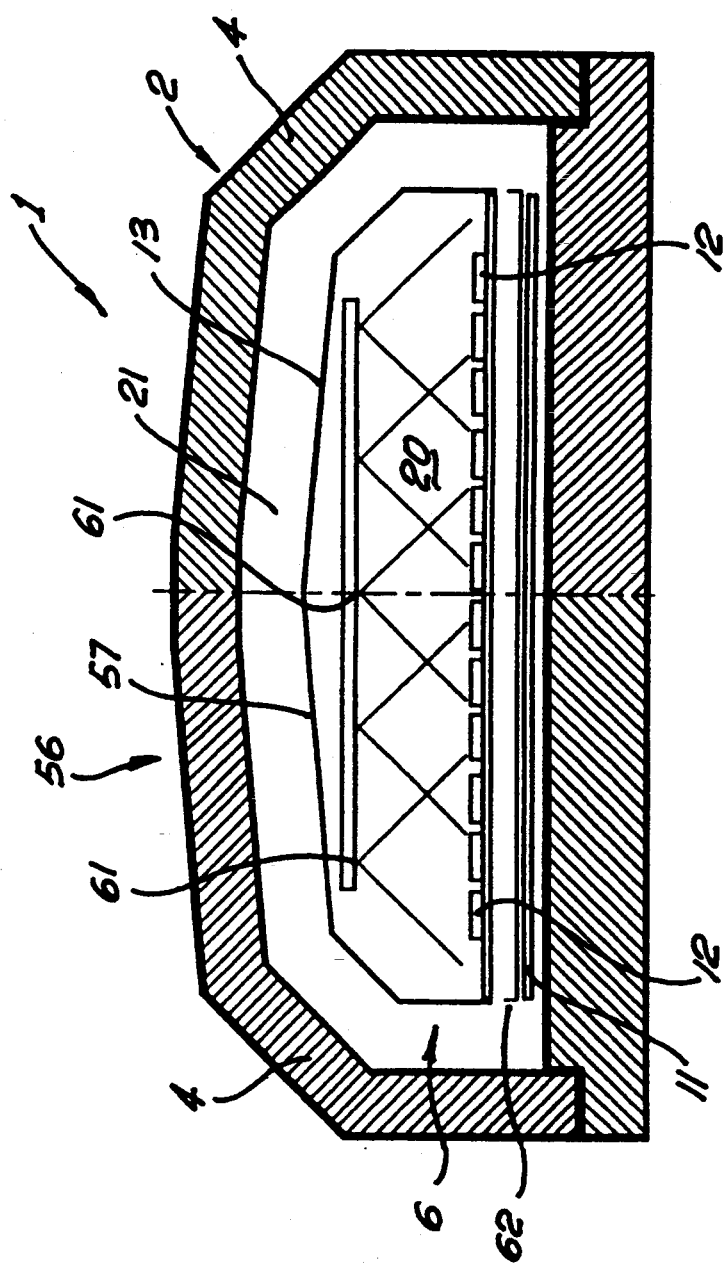
FIG. 4 is a sectional view taken along line 4—4 of FIG. 1.

Also included within the tunnel housing 2 are an exit zone 55 adjacent end 7 and a spraying zone 56 between entrance zone 52 and exit zone 55. As best shown in FIGS. 1 and 4 shroud 13 includes a shroud portion 57 which extends along the length of spraying zone 56 to define a continuation of the inner and outer zones, as described above. Shroud portion 57 is separated from adjacent shroud portions by way of gas curtains 59 and 60 in order to minimize any external disturbances.

Spraying zone 56 includes, within inner region 20, a matrix of spaced apart outlets 61 through which the cooling atmosphere is initially introduced into the tunnel 1. A drip tray 62 collects any condensation. Outlets 61 are configured to substantially evenly distribute the cooling atmosphere across the width of belt 11 such that uniform cooling and freezing occurs.

Figure 3:
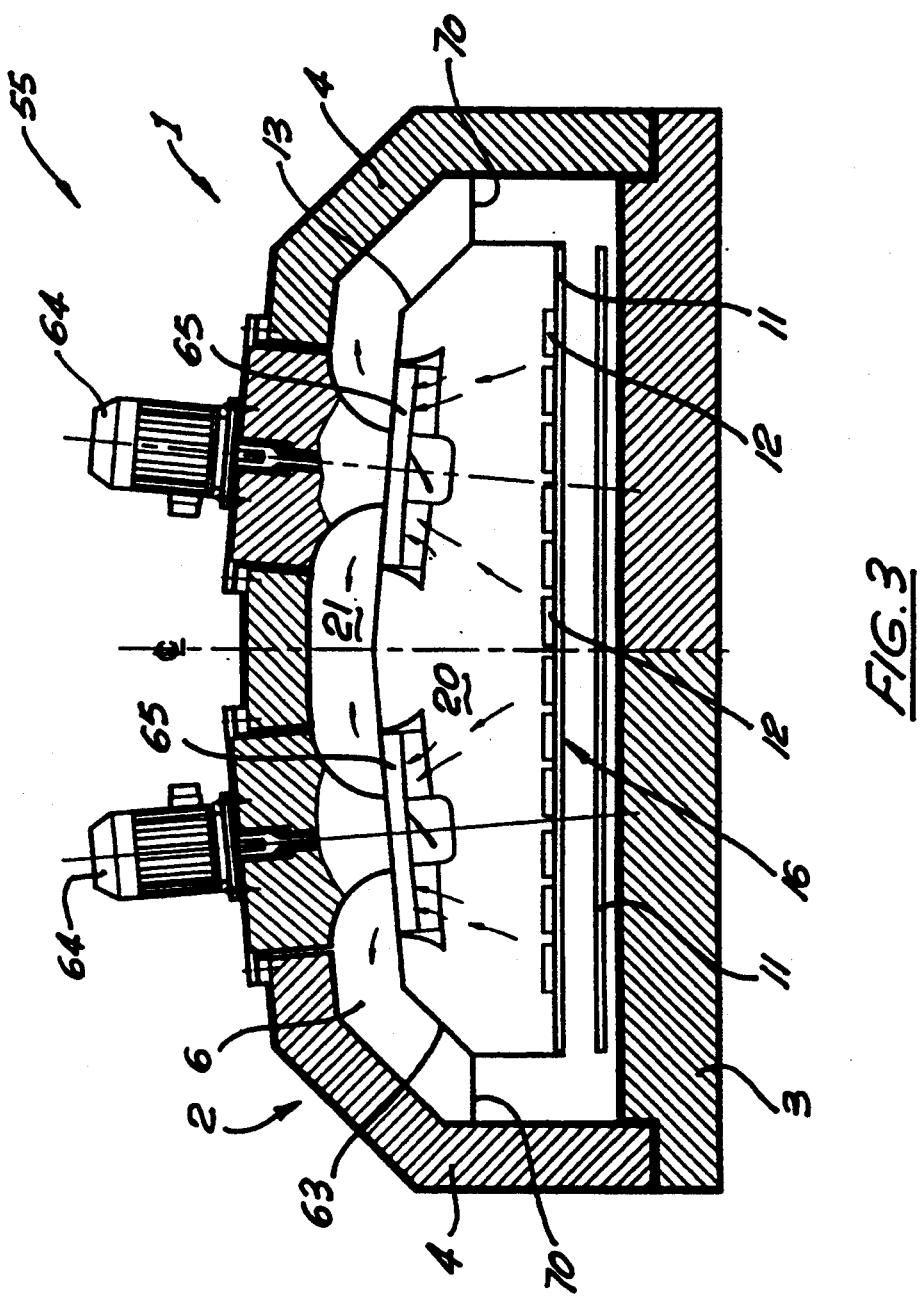
FIG. 3 is a sectional view taken through line 3—3 of FIG. 1.

As best illustrated in FIGS. 1 and 3, the exit zone 55 includes a single shroud portion 63 which is configured similarly to the shroud portions in the entrance zone 53 with some important exceptions. More specifically, fans 64 draw the cooling atmosphere from within inner region 20 through apertures 65 and thereafter urge it into outer region 21. Furthermore, partitions 70 prevent the cooling atmosphere from circulating about the shroud and ensure that the cooling atmosphere progresses within region 21 past zone 56 and toward end 8.

The end 7 includes an opening 66 through which the frozen articles exit tunnel 1. In this embodiment shroud portion 63 terminates against end 7 such that opening 66 communicates only with the inner region 20 for preventing the escape of the cooling atmosphere from within the tunnel. This configuration is advantageous as the cooling atmosphere is drawn away from end 7 and maintained within the tunnel for providing more efficient freezing of articles 12. Moreover, as the cooling atmosphere generally includes either liquid nitrogen or carbon dioxide it is desirable to prevent the escape of these gases from the tunnel 1. The described embodiment is configured for such purposes and as such provides for increased levels of operator safety.

In use, the cooling atmosphere is introduced in the spraying zone, and slowly progress from inner region 20 into both the exit and entrance zones 55, 52, respectively, through curtains 59 and 60 respectively. The cooling atmosphere that moves through belt 11 and around into outer region 21 is urged along tunnel 1 to the entrance zone 52 due to the action of fans 64.

The cooling atmosphere within the inner region 20 in the exit zone 55 is removed through apertures 65 by the action of fans 64 and directed past the spraying zone 55 toward the entrance zone 52 without having to pass back through the spraying zone 55. Consequently, both the escape of the cooling atmosphere from opening 66 and the disruption of the cooling atmosphere in the spraying zone 55 are prevented by the operation of shroud 13.

As the cooling atmosphere moves into the entrance zone 52 it is circulated about shroud 13, as described above, while simultaneously being drawn toward opening 53 under the influence of an exhaust fan (not shown) disposed adjacent opening 53. The speed and number of fans 29, 30, 39, 40 and 64 being operated is adjustable to ensure the desired circulation and temperature gradient within the tunnel 1.

Shroud 13 is able to be retrofitted into existing freezing tunnels such that the benefits of the present invention may be realized. The different belt widths and lengths are accommodated by appropriate scaling, and similarly belt speed is set in accordance with the required processing time. For example, a product such as meat patties will be required to be processed for approximately two minutes before being adequately frozen, while a tray of lasagna or other prepared food will take closer to thirty minutes given that its initial temperature is almost 60° C. These examples are given assuming the operating temperature of the tunnel is maintained within a range from about $-40°$ C. to $-120°$ C.

The cooling atmosphere flow rate is also variable, and the invention is suitable for use with all the values currently provided by prior art tunnels. Generally, flow rates in the order of 200 kg/hr to 2,000 kg/hr are encountered.

Other embodiments of the invention include a shroud 13 which extends along less than the entire length of tunnel 1. In one particular embodiment, the length of the shroud is substantially less than the length of the tunnel and encloses the spraying and exit zones only. While in further embodiments the shroud is utilized only in the entrance zone.

In a particularly preferred embodiment, fans 64 are variable speed fans which are responsive to the air temperature adjacent the opening 66. More specifically, if the cooling temperature falls below a predetermined value (as measured by a known temperature sensing device) corresponding to an excessive amount of the cooling atmosphere escaping through the opening, the fan speed is increased to prevent such escape. Conversely, if the temperature adjacent opening 66 rises above a predetermined value (corresponding to an excessive amount of the cooling atmosphere being prematurely evacuated from the inner region 20 and air being drawn into the tunnel housing 2 through the opening 66), the fan speed is subsequently lowered. The reduced fan speed prevents an excessive amount of air from entering the tunnel housing and building up moisture therein which reduces the cooling efficiency of the freezing apparatus.

It will be appreciated that, in conjunction with or as an alternative to variable speed fans, the pitch of the fan blades can be varied to produce the required flow of the cooling atmosphere through the tunnel housing 2. Additionally, the exhaust fan disposed adjacent the entrance of the tunnel housing 2 is preferably also a variable speed fan similar to fans 64 with an appropriate temperature sensor being disposed adjacent opening 52.

Figure 6:
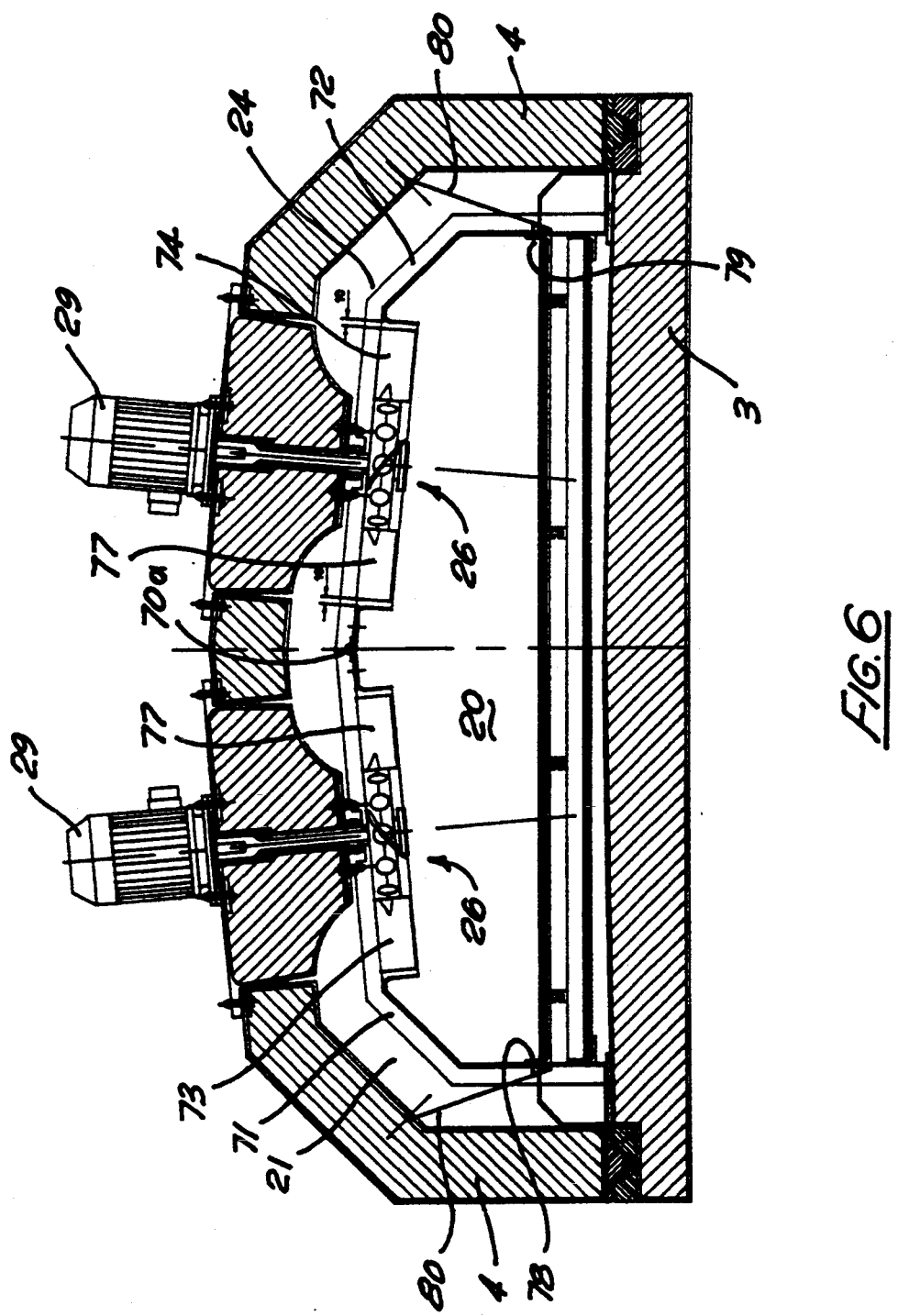
FIG. 6 is a cross-sectional view of another embodiment of the present invention.

Referring in particular to an alternative embodiment of the invention as illustrated in FIG. 6, shroud portion 24 is hinged about a central axis 70a to define two opposed shroud walls 71 and 72. These walls each include respective downwardly projecting lips 73 and 74 for defining apertures 26. These apertures are complementarily sized to accept the blades 77 of fans 29 and thereby allow the circulation of the cooling atmosphere between the inner and outer regions 20 and 21.

The lower terminal edges 78 and 79 of walls 71 and 72 are supported by a plurality of longitudinally spaced-apart struts 80. Preferably, the struts 80 are releasably captively retained at respective first ends 81 (see FIG. 7) to one of edges 78 and 79 and at their other respective ends 82 to an adjacent connector (not shown) on the inside of arched tunnel wall 4. More preferably, the struts 80 are hingedly or pivotably retained at both their respective ends 81 to facilitate relative rotational engagement between the ends 81 and the adjacent wall and connector.

Wall 4 and base 3 of the tunnel housing 2 are able to be separated to facilitate cleaning. This operation is generally performed by raising a discrete length of wall 4 which, in this embodiment, corresponds to the length of the underlying shroud portion 24. As shown best in FIG. 7, when the wall is raised, the fixed nature of axis 70a, in combination with the connection of wall 4 to edges 78 and 79 by way of struts 80, hinges walls 71 and 72 with respect to each other and the base 3. Accordingly, substantially unrestricted access to inner region 20 is provided for cleaning, maintenance or the like.

Figure 7:
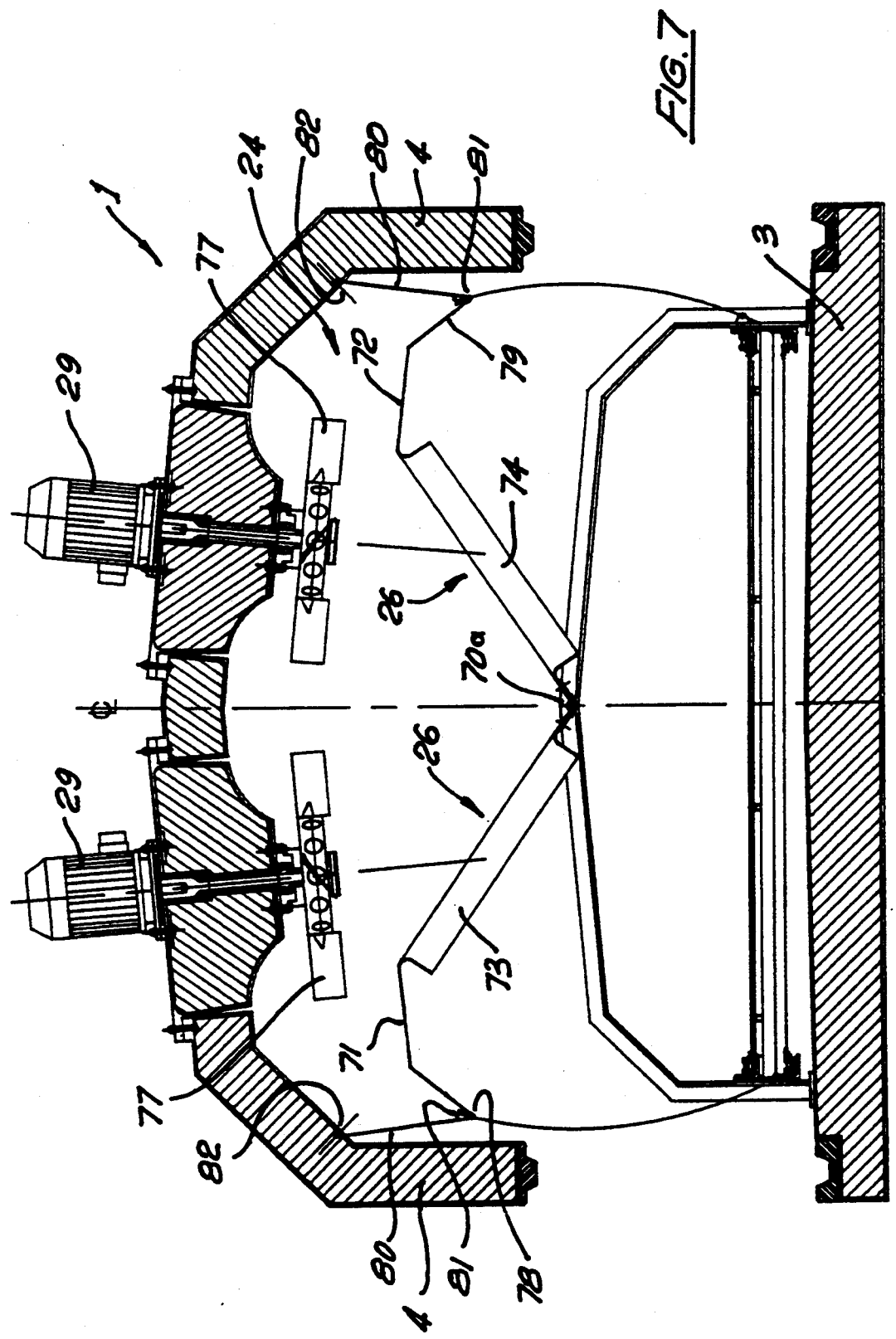
FIG. 7 is a view similar to FIG. 6 with the housing shown in the raised position.

It will be appreciated that all the shroud portions can be configured as described with reference to FIGS. 6 and 7 to include a hinged central axis.

Although the invention has been described with reference to a particular example, it would be appreciated by those skilled in the art that the invention may be embodied in many other forms.

What is claimed:

1. A freezing apparatus comprising: a longitudinally extending tunnel housing having first and second opposed ends for containing a cooling atmosphere which progresses longitudinally a from the first end of the housing to the second end; conveyor means for carrying articles to be frozen extending through the tunnel housing and being substantially pervious to said cooling atmosphere; and a shroud located within and positioned along the longitudinally extended tunnel housing defining an inner region within the tunnel housing and an outer region between the inner region and the tunnel housing, said shroud terminating in an opening adjacent the conveyor means and comprising first and second longitudinally spaced shroud portions each having an aperture for allowing fluid communication between said inner and outer regions, and airflow means for directing said cooling atmosphere through the aperture and said opening and past said articles, wherein the cooling atmosphere progresses substantially longitudinally between said first and second portions in said outer region.

2. The freezing apparatus of claim 1 wherein said shroud further comprises a gas curtain disposed in said inner region between said first and second shroud portions for substantially preventing the passage of said atmosphere within said inner region between said first and second shroud portions.

3. The freezing apparatus of claim 1 wherein said shroud further comprises third and fourth shroud portions disposed at opposed longitudinal ends of said first and second shroud portions, wherein the cooling atmosphere progresses in said inner region of the shroud between said third and first and said second and fourth shroud portions, respectively.

4. The freezing apparatus of claim 3 wherein said shroud further comprises a pair of spaced apart walls outwardly extending from respective junctions between said first and third and said second and fourth shroud portions and terminating at or adjacent said housing to prevent the longitudinal progression of said cooling atmosphere in said outer region.

5. The freezing apparatus of claim 3 further comprising an intermediate gas curtain for isolating each shroud portion from adjacent shroud portions in said inner region.

6. The freezing apparatus of claim 1 wherein said tunnel housing further comprises a base and transversely spaced-apart sidewalls extending from and being releasably engageable with said base, wherein at least one of said shroud portions is hinged about a longitudinal axis, thereby allowing rotation of said shroud portion when one or more of said sidewalls are disengaged from said base.

7. The freezing apparatus of claim 6 wherein said at least one of said first and second shroud portions is centrally hinged to form two opposed shroud walls, said shroud walls being connected to respective adjacent sidewalls and adapted for movement between a raised and lowered position in response to a movement of said sidewalls into and away from engagement with said base.

8. A freezing apparatus comprising: a longitudinally extending tunnel housing having first and second opposed ends for containing a cooling atmosphere which progresses longitudinally from the first end of the housing to the second end; a conveyor means for carrying articles to be frozen extending through the tunnel housing and being substantially pervious to said cooling atmosphere; and a shroud located within and positioned along the longitudinally extending tunnel housing defining an inner region within the tunnel housing and an outer region between the inner region and the tunnel housing, said shroud terminating in an opening adjacent the conveyor means and comprising first and second longitudinally spaced shroud portions each having an aperture for allowing fluid communication between said inner and outer regions and airflow means for directing said cooling atmosphere through the aperture and said opening and past said articles, wherein the cooling atmosphere progresses substantially longitudinally between said first and second portions in said inner region.

9. The freezing apparatus of claim 8 wherein said shroud further comprises a wall extending outwardly from the junction of said first and second portions to said tunnel housing for substantially preventing, in said outer region, the longitudinal progression of said cooling atmosphere between said first and second shroud portions.

10. The freezing apparatus of claim 8 comprising at least two of said shroud portions sequentially longitudinally arranged within said tunnel housing for ensuring that the progression of said cooling atmosphere between adjacent shroud portions alternately occurs in said inner and outer regions.

11. The freezing apparatus of claim 8 wherein adjacent shroud portions are separated in said inner region by an intermediate gas curtain.

12. The freezing apparatus of claim 8 wherein said tunnel housing further comprises a base and transversely spaced-apart sidewalls extending from and being releasably engageable with said base, wherein at least one of said shroud portions is hinged about a longitudinal axis, thereby allowing rotation of said shroud portion when one or more of said sidewalls are disengaged from said base.

13. The freezing apparatus of claim 12 wherein said at least one of said first and second shroud portions is centrally hinged to form two opposed shroud walls, said shroud walls being connected to respective adjacent sidewalls and adapted for movement between a raised and lowered position in response to a movement of said sidewalls into and away from engagement with said base.

14. A freezing apparatus comprising: a longitudinally extending tunnel housing having first and second opposed ends for containing a cooling atmosphere which progresses from the first to the second end; conveyor means for carrying articles to be frozen extending through the tunnel housing and being substantially pervious to said atmosphere; and a shroud disposed within the tunnel housing and terminating in an opening adjacent the conveyor means for defining an inner region within said shroud and an outer region between the inner region and the tunnel housing, said shroud comprising a first zone where the cooling atmosphere is introduced into said inner region and an adjacent second zone disposed between said first zone and said first end and having at least one aperture, and airflow means for directing said cooling atmosphere through said aperture from said inner to said outer region, wherein the cooling atmosphere is thereafter directed through said outer region past said first zone and toward said second end.

15. The freezing apparatus of claim 14 wherein said first and second zones are separated in said inner region by a gas curtain.

16. The freezing apparatus of claim 14 comprising means for sensing the temperature of the cooling atmosphere and comparing the same with a predetermined value and means for regulating the airflow means according to whether the temperature sensed is above or below the predetermined value.

17. The freezing apparatus of claim 16 wherein the airflow means comprises a variable speed fan, the speed of the fan being decreased when the cooling temperature rises above the predetermined value and the speed of the fan being increased when the cooling temperature falls below the predetermined value.

* * * * *